United States Patent [19]
Broadus

[11] Patent Number: 5,442,906
[45] Date of Patent: Aug. 22, 1995

[54] COMBINED GEOTHERMAL AND FOSSIL FUEL POWER PLANT

[75] Inventor: John G. Broadus, Los Angeles, Calif.

[73] Assignee: Union Oil Company of California, Los Angeles, Calif.

[21] Appl. No.: 982,786

[22] Filed: Nov. 30, 1992

[51] Int. Cl.[6] .............................................. F02C 6/00
[52] U.S. Cl. ............................ 60/39.182; 60/39.55; 60/641.2; 60/698
[58] Field of Search ............... 60/39.182, 39.53, 39.54, 60/39.55, 681, 641.2, 698

[56] References Cited

U.S. PATENT DOCUMENTS

| | | | |
|---|---|---|---|
| 2,927,428 | 3/1960 | Sala . | |
| 3,817,038 | 6/1974 | Paull et al. | 60/641.2 |
| 3,832,845 | 9/1974 | Aguet | 60/39.55 |
| 3,875,749 | 4/1975 | Baciu | 60/641 |
| 3,893,299 | 7/1975 | Hutchinson et al. | 60/641 |
| 3,908,380 | 9/1975 | Lobach | 60/641 |
| 3,910,050 | 10/1975 | Matthews et al. | 60/641 |
| 3,972,193 | 8/1976 | Sherwood | 60/641 |
| 4,021,299 | 5/1977 | Rigollot | 60/39.55 |
| 4,057,736 | 11/1977 | Jeppson | 307/78 |
| 4,057,964 | 11/1977 | Hutchinson | 60/641 |
| 4,057,966 | 11/1977 | Nikolaevich | 60/678 |
| 4,128,994 | 12/1978 | Cheng et al. | 60/39.05 |
| 4,132,075 | 6/1979 | Fleck et al. | 60/641 |
| 4,144,715 | 3/1979 | Fleck et al. | 60/641 |
| 4,152,898 | 5/1979 | Awerbuch | 60/641 |
| 4,193,259 | 3/1980 | Muenger et al. | 60/39.04 |
| 4,201,058 | 5/1980 | Vaughan | 60/618 |
| 4,248,039 | 2/1981 | Cheng | 60/39.05 |
| 4,249,385 | 2/1981 | Bissell | 60/674 |
| 4,255,933 | 3/1981 | Bailey et al. | 60/641 |
| 4,343,999 | 8/1982 | Wolf | 290/2 |
| 4,364,232 | 1/1983 | Sheinbaum | 60/641.2 |
| 4,366,675 | 1/1983 | Nishioka | 60/693 |
| 4,387,576 | 6/1983 | Bissell | 60/649 |
| 4,441,856 | 4/1984 | Tsujimura et al. | 415/155 |
| 4,516,402 | 5/1985 | Chang | 60/656 |
| 4,537,031 | 8/1985 | Terry et al. | 60/649 |
| 4,542,625 | 9/1985 | Bronicki | 60/641.2 |
| 4,576,006 | 3/1986 | Yamsoka | 60/641.5 |
| 4,590,384 | 5/1986 | Bronicki | 290/4 C |
| 4,766,730 | 8/1988 | Amano et al. | 60/641.5 |
| 4,829,763 | 5/1989 | Rao | 60/39.05 |
| 4,982,569 | 1/1991 | Bronicki | 60/698 |
| 4,996,846 | 3/1991 | Bronicki | 60/641.2 |

FOREIGN PATENT DOCUMENTS

| | | |
|---|---|---|
| 2151562 | 4/1973 | France . |
| 2648576 | 5/1978 | Germany . |
| 2660680 | 5/1985 | Germany . |

OTHER PUBLICATIONS

"Gas Turbines", by Thomas J. Putz, Mechanical Engineer's Handbook, pp. 9-173-9-182, Sixth Edition, 1958.
"Sourcebook on the Production of Electricity from Geothermal Energy", by Joseph Kestin, Published Mar. 1980, DOE/RA/4051-1, pp. 471-504.

*Primary Examiner*—Richard A. Bertsch
*Assistant Examiner*—W. J. Wicker
*Attorney, Agent, or Firm*—Gregory F. Wirzbicki; William O. Jacobson

[57] ABSTRACT

A power production process integrates geothermal steam and fossil fuel energy sources to give a higher energy efficiency than is normally obtained when using these energy sources individually. Geothermal steam is partially diverted from a steam turbine and injected into a combustion turbine. Although the steam turbine output is reduced by the diversion of steam, the plant efficiency and total plant output are improved.

11 Claims, 2 Drawing Sheets

COMBINED GEOTHERMAL AND FOSSIL FUEL POWER PLANT

FIELD OF THE INVENTION

This invention relates to power conversion systems and processes. More specifically, the invention is concerned with an apparatus and process for efficiently producing load-following electrical power from combined geothermal and fossil fuel energy sources.

BACKGROUND OF THE INVENTION

Generating electrical power is the typical goal of developing geothermal energy resources. Electrical energy is generated by converting the thermal energy of a geothermal fluid. Although the typical temperature of a geothermal resource (e.g., 500° F. or 260° C.), does not allow a high thermodynamic conversion efficiency, the large amount of geothermal fluids produced from some geothermal resources permits commercially feasible power generation.

A typical geothermal electrical power conversion facility or power plant includes production wells extracting the geothermal fluid from an underground geothermal resource, surface production facilities supplying a hot vapor under pressure (e.g., collection pipelines and steam separator/flash vessels if the geothermal fluid is a hot brine), a power conversion means extracting work (e.g., expanding the steam in a turbine-generator), a condenser for condensing the expanded vapor, and a source of coolant supplying the condenser (e.g., a cooling tower). Alternatively, a "binary" working fluid can be vaporized by the produced geothermal fluids and the binary vapor expanded in a turbine (instead of the geothermal fluid itself). Because of relatively high capital costs and difficulties in quickly changing geothermal production flowrates, the typical geothermal power plant operates at full load as much as possible, i.e., as a base load unit.

However, the demand for electric power is not constant over time, and storage of large amounts of electric power may be impractical. For example, night-time consumption patterns are different from the daylight consumption patterns. These changes in daily consumption patterns require other types of power plants, such as oil and gas fired steam units, to dispatch or load follow. Still other power plants are required to provide seasonal or peaking power (e.g., units operating only a few tens or hundreds of hours per year). Because these other types of power plants which accommodate demand changes cannot have their capital costs spread over as many kilowatt-hours as a baseload plant, capital intensive devices to improve efficiency are typically not present. The result is typically high fuel (and other operating) costs per unit of produced power.

What is needed is a more efficient method of producing power from geothermal resources that will better distribute capital costs and accommodate demand changes. This type of facility would avoid the need for several different types of power plants, decrease overall costs, and increase the usefulness of geothermal resources as a source of commercial geothermal power.

SUMMARY OF THE INVENTION

The present invention apportions geothermal steam between a steam turbine and a combustion turbine in an integrated power plant facility. When minimum output is required (e.g., at night), the integrated facility can operate as a geothermal-only fueled baseload unit. But more importantly, when more than minimal outputs are required, the present facility supplies combustible fuel and diverts a portion of the steam to the combustion turbine, producing power in peaking and load following modes. This power is also produced more efficiently than comparable separate baseload and demand controlled facilities. The combustion turbine can operate under various "wet" (i.e., with various amounts of diverted geothermal steam) or "dry" conditions to provide still further flexibility in demand controlled operation.

The electrical power output varies in spite of a constant flow of geothermal steam. The constant flow provides the minimum output within the varying range, driving a steam turbine-generator. When additional amounts of electrical output are needed, combustible fuel is supplied to a combustor along with a diverted portion of the steam flow reducing the output of the steam turbine. The combustor's combustion gases and diverted steam more efficiently produce additional amounts of power from a combustion turbine which more than makes up for the loss of output from lessened steam flow to the steam turbine-generator. When the demand for electrical power declines, diverted steam from the constant flow supplied is returned to the steam turbine, producing an increment of output from the steam turbine but a decrement in output from the combustion turbine larger then the increment.

DETAILED DESCRIPTION OF THE INVENTION

Figure 1:
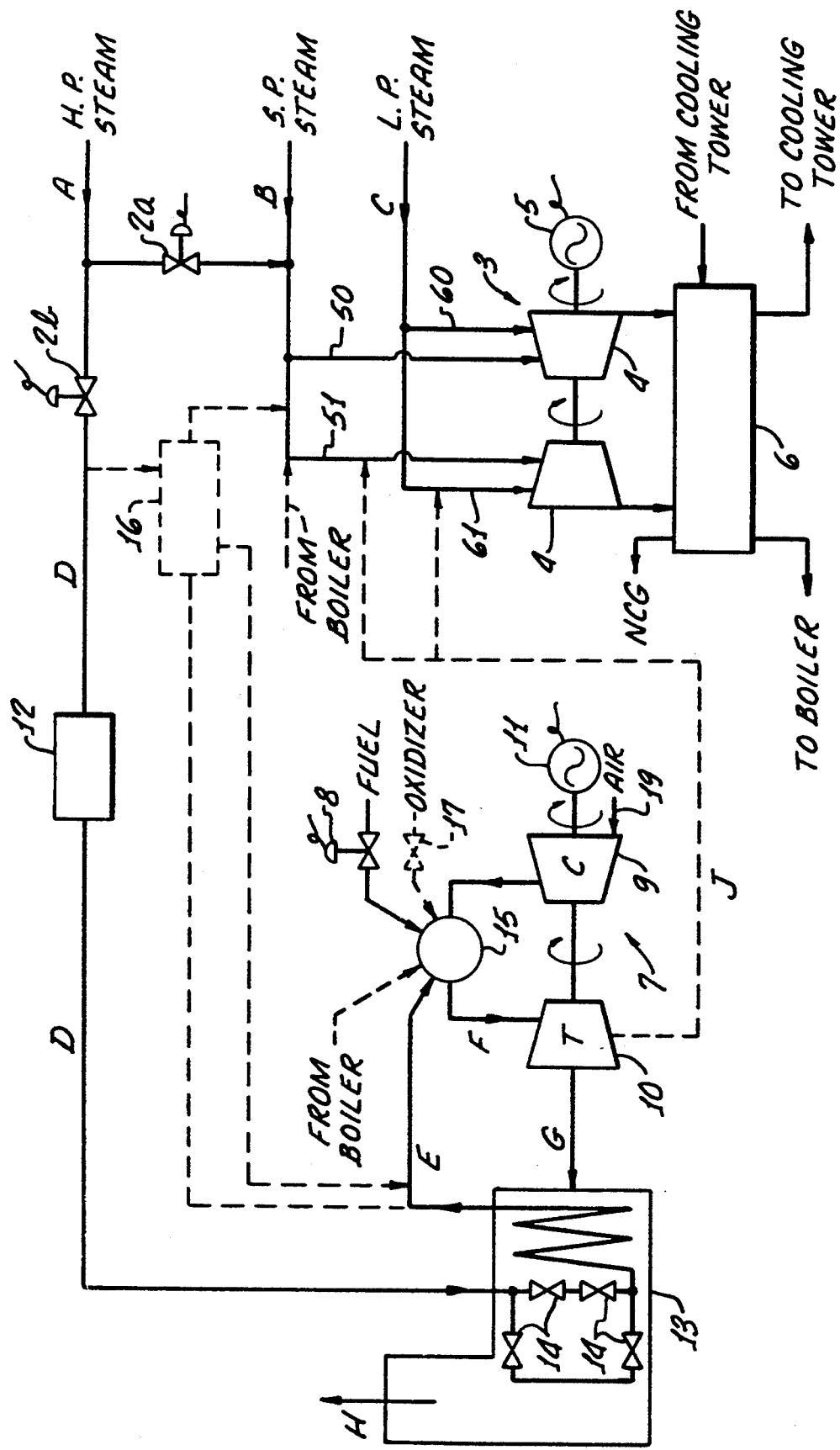
FIG. 1 shows a process schematic of a preferred embodiment of the combined geothermal steam turbine and combustion turbine power plant.

FIG. 1 shows a process schematic of a preferred embodiment of a combined steam and combustion turbine power plant. Specifically, the steam portion is based upon an existing flashed brine geothermal power plant located in the Imperial Valley, Calif., but the process may be applied to other geothermal and non-geothermal facilities or sources of heat, especially steam sources, and most especially if these other steam or heat sources are available on a nearly constant basis. Other relatively constant sources of heat include industrial facilities requiring steam for various processes, commercial steam heating facilities, and other base loaded power generation facilities.

In the preferred embodiment of the process invention, three steam flows (at different pressures) are separated or flashed from geothermal brine produced by wells penetrating an underground, liquid dominated geothermal resource. A relatively high pressure (H.P.) steam flow "A," can be derived from a wellhead separator (not shown), where flashing of the brine mostly occurs within the production well. A nominal wellhead separator pressure for this flow at the Salton Sea Resource is about 375 psia (25.5 atm), but the pressure of this flow typically ranges from about 285 to 450 psia (19.4 to 30.6 atm), most typically within the range from about 355 to 390 psia (24.1 to 26.5 atm).

Another source of relatively high pressure geothermal steam can be derived from a collection separator or first stage flash vessel where geothermal fluids from several wells are mixed and reduced in pressure to optimize plant output from the several wells. Because of well variations and energy tradeoffs (increasing amounts of steam flashed at lower pressures vs. higher productivity of the lesser amount of flashed steam at higher pressures), the selected pressure can vary widely for different resources. A nominal high pressure for this flow (shown as "A" in FIG. 1) at the Salton Sea Resource has been selected as about 225 psia (15.3 atm) for an example now being described, but the pressure of this flow "A" can easily range from less than about 100 to more than 450 psia (6.8 to 30.6 atm). Similarly, flow "A" has a nominal flowrate for the example facilities and wells of between about 350,000 and 400,000 lb/hr (159,000 and 181,000 kg/hr), but the geothermal flowrate "A" can be widely variable for different applications. Although the geothermal steam flow "A" is nominally saturated, it will be understood by those skilled in the art that the geothermal steam may also contain a significant amount of liquid, such as brine carryover, or may be superheated.

The H.P. steam flow "A" from a geothermal resource also typically contains non-condensible gases (NCG). The NCG are primarily composed of $CO_2$ but also typically include $H_2S$ or other constituents whose emission might require abatement or control. In a conventional geothermal-only steam power plant, the non-condensible gases (NCG) must be pumped out of a condenser, typically by a steam ejector or mechanical vacuum pump. The power needed to pump out the condenser can be a significant parasitic load on the steam power plant if the amount of non-condensible gas in the steam is significant, for example, more than about 0.5% by weight, especially if more than about 1% by weight. In addition, the treatment of the $H_2S$ constituent, for example by a Stretford process, can cost a significant amount of capital and operating dollars. In the example now being discussed, the NCG content of steam flow "A" typically ranges from about 0.6 to 0.8 percent and the $H_2S$ content typically ranges from about 40 to 60 ppm.

A second steam flow "B" typically contains little or no NCG and is derived from a crystallizer or separator/flash vessel (not shown) at an intermediate or standard pressure (S.P.). The S.P. vessel is typically supplied concentrated brine from the first (H.P.) vessel. A nominal pressure for this steam flow "B" at the example Salton Sea geothermal facility is about 145 psia (9.9 atmospheres), but the pressure typically ranges from about 130 to 150 psia (8.8 to 10.2 atm), more typically within the range from about 135 to 145 psia (9.2 to 9.9 atm). Pressure range for S.P. flows at other geothermal locations can vary much more widely. Although the S.P. steam flow "B" is nominally saturated and has a nominal flowrate of about 300,000 lb/hr (136,000 kg/hr), it will be understood by those skilled in the art that the steam flow may vary widely and may again contain a significant amount of liquid or may be superheated.

The final steam flow "C" typically contains little or no NCG and is derived from a low pressure (L.P.) crystallizer or separator/flash vessel (not shown). The L.P. vessel is supplied by concentrated brine from the I.P. vessel. Although the pressure of flow "C" can vary widely, a nominal low pressure at the Salton Sea facility example is about 35 psia (2.4 atmospheres), typically varying from about 25 to 45 psia (1.7 to 3.1 atm), more typically from about 30 to 40 psia (2.0 to 2.7 atm). Although the L.P. steam flow "C" is nominally saturated and has a nominal flowrate of about 100,000 lb/hr (45,000 kg/hr), it will be understood by those skilled in the art that the steam flowrate may vary widely and may contain a significant amount of liquid or may be superheated steam.

The entire high pressure steam flow "A" can be throttled in control valve 2a to the intermediate pressure of the S.P. steam flow "B." After throttling, the combined steam flows "A" and "B" are split into conduits 50 and 51 and enter the steam turbine-generator 3. Double steam turbine portions 4 of the turbine-generator 3 each enclose a similar series of turbine blades mounted on a rotatable shaft. The rotating series of blades expand the intermediate pressure steam flow in stages, extracting power. The shaft connects the dual steam turbines 4 and drives an electrical generator 5. When the intermediate pressure steam has been expanded to about the pressure of steam flow "C," nominally at stage number 3, the split L.P. steam flow "C" is also admitted to the steam turbines 4 via conduits 60 and 61. The combined steam flows are expanded through the remainder of the expansion stages until the steam is discharged, typically at vacuum conditions to a closely coupled condenser 6 supplied by a cooling tower (not shown). The NCG remaining after condensing the steam is pumped out of the condenser, typically by a vacuum pump or steam ejector (not shown), and may also be treated prior to discharge (to control the emission of $H_2S$ or other constituents). It will be appreciated by those skilled in the art that many other controls and other supporting equipment for the turbine-generator 3 may be present but not shown in the interests of clarity.

When all of the H.P. steam flow "A" is used in the steam turbines 4, control valve 2a is fully opened and control valve 2b is closed. This full amount of steam is used to generate the base load or minimum level output of the steam turbine-generator 3, in the example of the Salton Sea facility presented herein, about 49.8 MW.

At the other extreme, all of the H.P. steam flow "A" can be diverted so that none is used in the steam turbine-generator 3. This full diversion of H.P. steam is accomplished by closing steam control valve 2a and fully opening steam control valve 2b. In the example of the Salton Sea unit presented herein, the steam diversion would reduce the power output of the turbine assembly 3 to about 26.9 MW. However, this decrease of about 22.9 MW is more than made up for by injecting the diverted (H.P.) steam flow into a combustion turbine-generator unit 7. The fully fossil and diverted steam injected fueled combustion turbine-generator unit 7 adds about 112 MW as later discussed, a net gain of about 89.1 MW in total plant output.

In addition, both steam control valves 2a and 2b can be partially opened and the H.P. steam flow "A" can be partitioned as the electrical demand varies. For the example herein, a portion of the H.P. steam flow "A" can be variously apportioned to allow the plant to efficiently load follow from about 49.8 MW (produced by the steam turbine-generator only) to about 138.9 MW (produced from the combined combustion/steam injected turbine-generator unit 7 and the partly-loaded steam turbine-generator 3).

Apportioning control of the steam control valves 2a and 2b (and fuel control device 8) may be accomplished manually but would more commonly be accomplished by a programmable load-following controller (not shown). The programmable controller would receive data on the electrical demand and the plant output, compare the output to an indicator of the (varying) demand to produce a measured difference, and adjust the steam control valves (2a and 2b) and fuel control device 8 to correct for the measured difference, i.e., control the plant output to load follow. It will be appreciated by those skilled in the art that many other items of supporting equipment, such as data sensors and transmitters, may be required for load following control (and other control modes such as load shedding and "black" start) and have not be shown in the interests of clarity.

The combustion or gas turbine assembly 7 comprises an air compressor 9, combustor 15, combustion turbine 10, an exhaust gas heat recovery section 13, and a second electrical generator 11. Although a second electrical generator 11 is shown schematically, it will be understood by those skilled in the art that the two electrical generators shown may be combined in one unit driven by two (turbine) power sources or comprise a plurality of generators. If combined, the combustion turbine and the steam turbine might nominally drive a single 138.9 MW rated capacity unit instead of two units having a combined rating of 161.8 MW.

As an example of a combustion turbine assembly 7, a plurality of Allison 501-KH combustion turbines can be used to modify an existing baseload geothermal power plant, such as the example Salton Sea Unit III facility located in the Imperial Valley of California. The Allison 501-KH units are commercially available from Stewart & Stevenson Inc., located in Houston, Tex. Operating "dry" (without steam injection), one of these units nominally compresses 34.3 lb/sec (15.56 kg/sec) of air and consumes fuel at a heat rate of about 41.9 mmbtu/hr ($44.2 \times 10^{15}$ joules) to generate 3497 kw and hot exhaust gases at 977° F. (525° C.). Excess air (i.e., the amount beyond that needed for combustion of the fuel) via line 19 controls combustion temperatures to about 1800° F. (982.2° C.) to limit NOX emissions and to stay within the temperature limitations of the materials of construction. The resulting hot exhaust gases from the combustion turbine can be used in an optional heat recovery section, e.g., in a co-generation application.

In this embodiment, the combustion turbine 10 will operate "wet" (with geothermal steam injection) and use the heat recovery unit to superheat the geothermal steam prior to injection. For injecting 19,800 lb/hr (8980 kg/hr) of saturated 225 psia (15.31 atm) steam, one of these Allison units would nominally consume a hydrocarbon fuel at a heat rate of 51.4 mmbtu/hr ($54.2 \times 10^{15}$ joules) and compress 33.65 lb/sec (15.26 kg/sec) of air to generate 5936 kw. The supplied geothermal steam would be superheated to about 900° F. (482.2° C.) prior to injection into the combustor 15. Expended exhaust gases (after superheating the geothermal steam) may still be useful for a (lower temperature) co-generation application or discharged (as shown) to the atmosphere.

These Allison units therefore achieve an improved hydrocarbon fuel efficiency when operating "wet." The "dry" heat rate, using a lower heat value of the hydrocarbon fuel, of 11,980 btu/kw-hr ($12.637 \times 10^6$ joules/kw-hr) is reduced to 8,660 btu/kw-hr ($9,135 \times 10^6$ joules/kw-hr) when operating "wet." The injected steam not only expands to directly provide power, it also reduces the amount of excess air needed to control combustion temperature, decreasing the compressor work. Using these values, diverted geothermal steam would account for nearly 28% of the net power output of the combustion turbine units when operated in this mode. Using the nominal steam flowrate "A" of the H.P. steam from the Salton Sea Unit III, a total output of (e.g., using 19 Allison units or other combustion turbine-generator units having similar performance) of about 112 MW can be obtained from diverting flowrate "A" to the "wet" combustion turbine-generator(s).

Returning to FIG. 1, the diverted H.P. steam flow portion "D" is shown entering a treatment device 12 before being superheated and injected into combustion turbine assembly 7, but if the steam quality from the geothermal (or other) source is clean enough, the treatment device 12 may not be required. If required, the treatment device 12 may consist of as little as a periodically opened trap (to remove excess condensate or liquid carryover). More extensive treatment may include on-line monitoring of moisture and total dissolved solids (TDS), chemical additives, and unwanted constituent removal means.

Treatment required is a function of the design of the combustion turbine, materials of construction, operation, and maintenance. For example, a fuel and steam supply TDS of no more than 200 ppb may be desirable for extended operations of a steam-injected combustion turbine. However, a much higher level of TDS in an injected steam supply may be tolerated if the turbine is operated at full load only during the day and flushed every night. A still higher level of TDS in the injected steam can be tolerated if the daytime operation is at part load and treatment additives are included. Although the treatment of the diverted steam in treatment device 12 is application specific, extensive treatment is not expected to be required for a steam flowrate clean enough to be used in a steam turbine.

After treatment, if required, the steam flow "D" enters the exhaust heat recovery section 13 of the combustion turbine assembly 7. Since the steam flow "D" is typically near a nominal saturated pressure of 225 psia (15.3 atmospheres) having a temperature of less than 400° F. (204.4° C.) and the exhaust gases are nominally over 900° F. (482.2° C.), heat is transferred from the exhaust gases to the steam flow "D." Recovery control valves 14 can be used to control and/or optimize steam flow through various portions of the heat recovery unit 13.

After passing through the heat recovery section 13, the heated steam flow "E" is nominally at a temperature of about 900° F. (482.2° C.), but the steam temperature can typically vary from about 400 to 1100° F. (204.4° to 593.3° C.), more typically ranging from about 700° to 1000° F. (371.1° to 537.8° C.). The pressure of steam flow "E" is only slightly reduced from the nominal H.P. steam conditions of 225 psia (15.3 atm). The heated steam flow "E" is nominally no longer close to saturated, but is superheated.

Because of the $H_2S$ constituent of the non-condensible gas portion of the typical steam flow "D," the heat recovery section 13 and other equipment may have to be resistant to corrosion by this constituent. Corrosion-resistant equipment may be composed of stainless steel. If the H.P. steam supply (or treatment device 12) provides a steam flow "D" which does not contain significant amounts of H₂S or other corrosive gases, less costly materials of construction may be used in the heat recovery section 13, such as low carbon steel.

The heated steam flow "E" then enters a pressurized combustor 15 along with ambient air (AIR in FIG. 1) compressed by compressor 9 and fuel (through control device 8). It will be understood that the injected steam and air flows may be introduced in several stages before, during, or after the actual combustion process.

Each of the steam, compressed air, and fuel flows must be at least slightly above the pressure of the combustor 15. Although the combustion pressure is nominally 225 psia (15.3 atm) for the example herein, the pressure may vary widely for different resources and available compression on combustion turbines. Combustor 15 pressures may typically range from about 45 psia to as high as 330 psia (3.06 to 22.46 atm) or more.

Although combustor 15 pressures are more typically in the range from about 90 to 270 psia (6.12 to 18.37 atm) and the Salton Sea geothermal resource can supply large amounts of saturated steam at any pressure in this range, other geothermal resources (or other sources) may not be adequate to supply this steam at the pressure and temperature conditions required by a combustion turbine assembly. Lower pressure steam may require a means for increasing the pressure and/or temperature of the steam flow "E," for example a steam booster pump 16 (shown dotted as optional equipment for clarity). Lower pressure steam from steam flow "D" would be expanded to the lower pressure of S.P. steam flow "B" to operate the booster pump 16, the expansion of S.P. steam raising the pressure of steam flow "E." If the expansion in booster pump 16 produces unacceptable amounts of wetness in S.P. steam flow "B," a portion of the steam supply or discharge from booster pump 16 can also be diverted to be superheated in heat recovery section 13 (not shown) before being discharged into steam flow "B." If a still higher temperature air/steam mixture is required for the steam turbines 4, a separate fossil-fueled combustion heater (not shown) for the injected steam may be incorporated, e.g., at booster steam pump 16.

Control of the fuel to be combusted in combustor 15 depends upon the fuel source. The preferred fuel is a pressurized natural gas, but many other fuels can be used, such as a liquid or gaseous hydrocarbon. The fuel control device 8 may be a single controlled metering pump for a liquid fuel, a control valve for a pressurized natural gas (pipeline) fuel, or combinations of control valves and pumps for other fuels. Control of the fuel flowrate by control device 8 can be independent of the steam turbine controls or can be combined with steam diversion control and based upon electrical demand as previously described.

The fuel and air mixture is burned in combustor 15 and mixed with the injected steam flow "E" to produce a gas/steam mixture flow "F." The mixture "F" is expanded through the combustion turbine assembly 7 which (via a rotating shaft) drives compressor 9 and electrical generator 11. It will be appreciated by one skilled in the art that the rotating shaft may also include speed reducers, couplings, and other devices not shown for clarity.

Alternatively, the flow mixture "F" may comprise only a portion of the diverted steam, the remainder being injected directly into the combustion turbine assembly 7. The partial combustor injection of steam provides a more precise control on combustion temperature. This alternative would also permit a lower pressure steam portion to be injected into a downstream (lower pressure) stage of the combustion turbine.

However, the preferred steam mixing and combustion process all occurs in the combustor 15 which tends to oxidize the H₂S constituent of the geothermal steam. Combustion of the H₂S may reduce or avoid the need to separately treat this constituent, e.g., in a Stretford process, if the steam were used in a conventional geothermal power plant. The mixture of steam and combustion gases in the combustor 15 may also reduce the combustion temperature which tends to decrease the amount of nitrous oxides produced and/or the amount of excess air required to be compressed. This may similarly reduce parasitic loads and/or avoid the need to treat exhaust gases.

The combustion turbine 10 typically expands the gas/steam mixture "F" derived from combustor 15 to the exhaust conditions "G" entering the exhaust gas heat recovery section 13. The exhaust gas/steam flow "G" is nominally above about 900° F. (482.2° C.) and at a nominal pressure of slightly above one atmosphere, but the temperature and pressure can vary widely. The expansion may be accomplished in a single stage, but more typically is accomplished in a plurality of expansion stages.

After recovery of the heat in the exhaust gas/steam flow "G" within the heat recovery section 13, the discharge gas/steam flow "H" may still have an elevated temperature and be used for other heating purposes (not shown). For example, the exhaust gas/steam flow "H" may supply preheating of a boiler feed or combustion air for a conventional fossil fuel steam power unit. The discharge gas/steam flow "H" may also require treatment (not shown) to control emissions prior to discharge.

The compressed air supplied to the combustor 15 is preferably ambient air compressed by compressor 9 to a nominal pressure of 225 psia (15.31 atm), but combustor pressures typically range from 45 to 330 psia (3.06 to 22.46 atm) or more. The compressor 9 is shown driven by the combustion turbine 10, but alternatively may be separately driven by other drive means, e.g., a steam turbine or electric motor. The compressor 9 may accomplish the compression in a single stage, but more typically includes a number of compression stages. Intercooling of partially compressed air between stages may also be accomplished to improve the compression efficiency of compressor 9.

An alternative peaking mode embodiment, shown dotted for clarity, adds a flow of oxidizer from a pressurized source of oxidizer to the combustor 15 controlled by oxidizer control valve 17. For example, the oxidizer source can be pressurized tanks of gaseous or liquid oxygen. Supplying oxidizer (for a short period of time) allows a further reduction in the amount of air to be compressed and the amount of power needed to compress it (e.g., added steam may replace the nitrogen content of the air no longer needed for combustion). The oxidizer addition may also increase the combustion temperature even if added steam is injected, increasing the power output. The additional steam may be derived directly from the geothermal steam source (if available) or generated from a separate source, such as condensate in the condenser supplied to a pump and a fossil fueled boiler (shown as optional dotted "TO BOILER" and "FROM BOILER" arrows). The oxidized and further steam enriched combustion turbine flow (and reduced amount of air compression work) can significantly increase the net output of the plant for short (peaking) periods. Additional steam (e.g., from a condensate boiler) could also be used in the steam turbine to replace the diverted steam and generate additional amounts of output from the (underutilized) generator 5 on a peaking basis.

Another peaking alternative embodiment could draw a portion of the steam-enriched combustion flow "J" from combustion turbine 10 (shown dotted as an option for clarity) or from combustor 15 and diverting flow "J" to the steam turbine unit (producing at less than full capacity without diverted steam flow "A"). This re-diverting back of some of the steam flow "A," now mixed with combustion gases in flow "J," would replace a portion of the diverted flow and be expanded to vacuum conditions (instead of atmospheric pressure in the combustion turbine). The steam portion of flow "J" would be condensed in the condenser, and the combustion gas portion removed from the condenser by the NCG removal unit. Since the peaking mode diverts all of the NCG-containing H.P. flow "A," the NCG removal means attached to the condenser 6 is designed to handle a significant amount of (non-condensible) exhaust gases.

The mixed steam/combustion gas flow "J" to the steam turbine would add heat and mass flow to the expanding steam. This added flow would generate added power and reduce low pressure stage losses due to wetness (typical in the steam turbines using saturated steam). This increased total plant output avoids the need for standby capacity turbines and generators since the added flow partially replaces the diverted steam flow "A." Alternatively, the steam-enriched mixed flow "J" could be taken from the heat recovery unit 13 at near atmospheric pressure and expanded to vacuum conditions in the steam turbine 3 to produce added output from steam generator 5.

Returning to the preferred embodiment shown in FIG. 1, the geothermal steam is used to produce at least a significant fraction of the power produced by both turbine-generator assemblies 3 and 7. The combustion turbine can produce about 112 MW with diverted steam being injected, substantially more than "dry" operation. When this "wet" combustion turbine output is combined with the (decreased) output of steam turbine 3, a rated total output of 138.9 MW can be efficiently produced. The percentage contributed to the total plant output by each turbine is a function of the steam flow diverted from the steam turbines 4 to the combustion turbine assembly 7.

Figure 2:
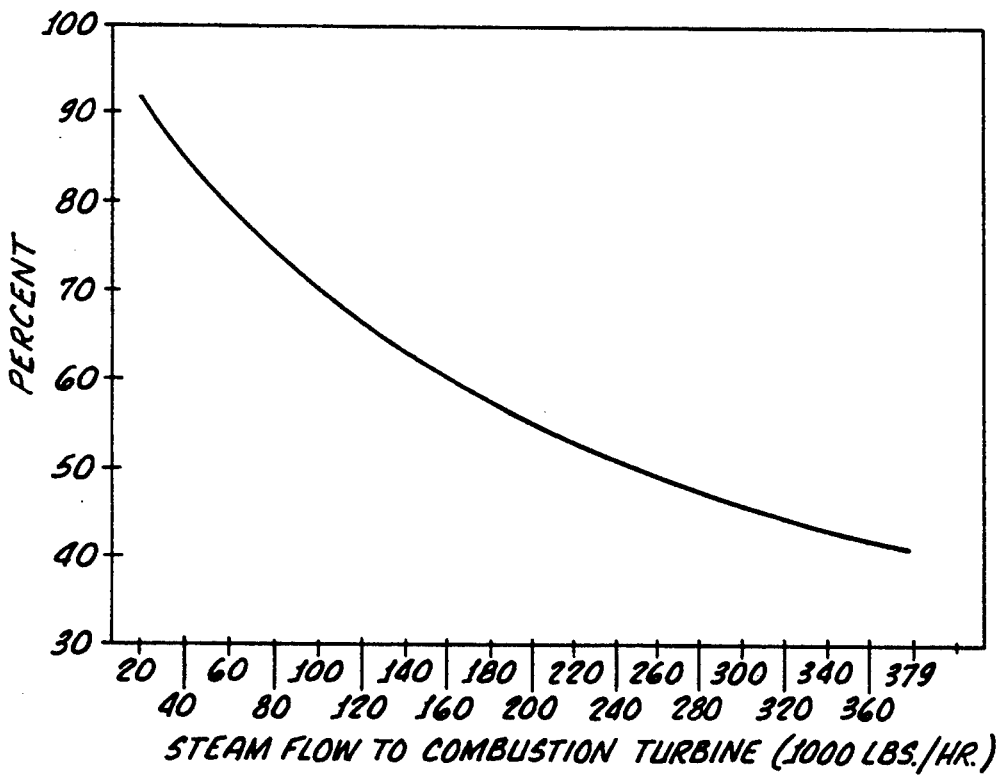
FIG. 2 shows a plot of the percentage geothermal contribution to the output of the plant shown in FIG. 1.

FIG. 2 is a plot of the geothermal percent contribution to the example plant output as a function of the steam flow diverted to the combustion turbine assembly 7 shown in FIG. 1. At no steam (or fuel) flow to the combustion turbine assembly 7, 100% of the power output is produced by the steam turbines 4. As a portion of the H.P. steam is diverted (and fuel is supplied) to the combustion turbine assembly 7, an increasing percentage of the rising combined plant output is derived from the hydrocarbon fuel. However, using the Salton Sea facility example, even at full nominal output and full diversion of the H.P. steam flow "A" to the combustion turbine assembly 7, the remaining steam turbine assembly output (from S.P. and L.P. flows) and the portion of the plant output attributable to the geothermal steam remains above 40 percent. Loads can be followed down to about 36 percent of the full nominal plant output rating of 138.9 MW. The difference between the above 40 percent (from geothermal in full operation) and 36 percent (from baseload, all-geothermal) values is another indication of the improved efficiency when steam is diverted.

As shown by FIG. 2, the amount of steam flow that may be diverted from the steam turbine to the combustion turbine is significant and substantial. Although the example herein presented diverts up to 100 percent of the high pressure steam flow, other applications could divert smaller portions of one or more steam flows from a steam turbine to a combustion turbine. Although diversion of as little as one percent or less of one of the steam flows from the steam turbine to the combustion turbine would show significant benefits in decreased NOX emissions, decreased compression work, and increased net plant output, diversions of at least 5 percent of the steam turbine's rated steam flow would be expected for optimum efficiency and variable plant outputs, probably steam diversions of at least 10 percent.

Figure 3:
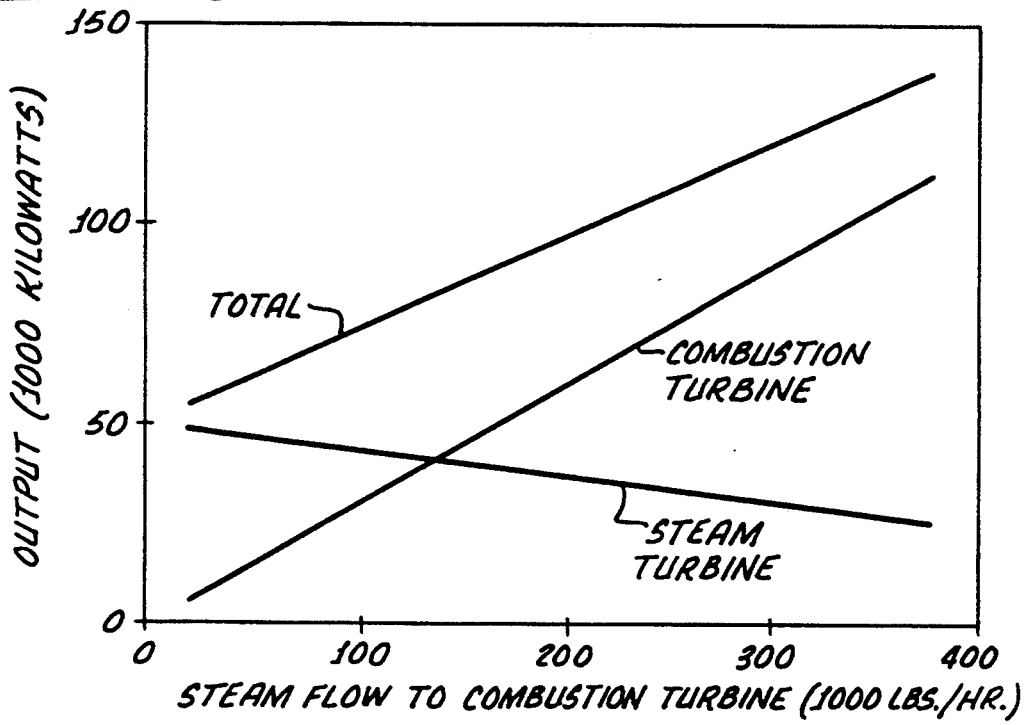
FIG. 3 shows a plot of each turbine output and total output of the plant shown in FIG. 1.

FIG. 3 is a plot of the total plant output (and the output from each turbine assembly) as a function of diverted geothermal steam flow to the combustion turbine. Although the diversion of H.P. steam flow "A" from the steam turbine assembly 3 (as shown in FIG. 1) reduces its output, the net plant output increases as more steam is diverted to the combustion turbine 7. Although not shown, the overall plant efficiency in producing power from both the geothermal and combustible fuel sources is also expected to generally increase as more steam is diverted, at least until significant reductions in turbine inlet temperatures are experienced.

The invention is distinguishable from combined cycle plants. These plants use the exhaust heat generated by a combustion turbine to supply at least a portion of the heat needed to supply steam to a steam turbine cycle, e.g., exhaust gases from a combustion turbine preheats boiler feed water. Key differences are 1) the absence of substantial exhaust gas heating for the steam cycle (e.g, heat is not supplied to most of the geothermal steam going to the steam turbine, 2) the diversion of a substantial amount of steam from the steam turbine unit to the combustion turbine, and 3) the inversely integrated operation of the steam turbine at significantly less than full capacity when the combustion turbine is operated at full capacity. The steam diversion and integrated controls join the turbine outputs in such a way so as to increase combustion turbine output and efficiency, but giving up the full output of the steam turbine. This integrated system also allows efficient load following control.

The preferred process also uses a production flow rate of geothermal steam that is relatively constant to produce variable power outputs. Diverting a portion of the (constant) steam flowrate satisfies the need to produce a variable output power plant when combined with a combustible fuel. The minimum baseload output produced by the steam turbine unit amortizes the relatively high cost of the (constantly producing) geothermal wells and associated equipment. By apportioning the geothermal steam during higher output operating modes, an improved combustible and geothermal fuel efficiency is achieved along with an increased output, while maintaining or reducing emissions.

Still other alternative embodiments are possible. These include: using a portion of the combustion gases or (combustion turbine) exhaust heat to superheat all or some of the geothermal steam streams entering the steam turbine during load following or peaking operation; using a different number of geothermal steam pressure level supply streams, e.g. using two stages of steam separation/flash; replacing the turbines with other power producing engines; and having several sources of steam being apportioned between the combustion and steam turbines.

While the preferred embodiment of the invention has been shown and described, and some alternative embodiments also shown and/or described, changes and modifications may be made thereto without departing from the invention. Accordingly, it is intended to embrace within the invention all such changes, modifications and alternative embodiments as fall within the spirit and scope of the appended claims.

What is claimed is:

1. An apparatus for generating varying amounts of electric power which comprises:
   a source of geothermal steam producing a first flow of steam;
   a steam turbine which, when driven by said first flow of steam, generates a first amount of electric power;
   a source of combustible fuel;
   a combustion turbine which, when supplied by a flow of combustion products derived from said combustible fuel and an injected flow of steam, is capable of generating a second amount of electric power; and
   means for diverting a portion of said first flow from the inlet of said steam turbine to said combustion turbine to supply said injected flow.

2. The apparatus of claim 1 wherein said combustion turbine and said apparatus also comprises:
   means for combusting said combustible fuel and mixing said injected flow to produce mixed combustion gases;
   means for supplying compressed air to said combusting means; and
   means for controlling said injected flow and said combustible fuel flow so as to produce said varying amounts of electric power in response to changes in a demand for electric power.

3. The apparatus of claim 2 which also comprises corrosion-resistant means for recovering and transferring heat from mixed combustion gases near the turbine exhaust to a portion of said injected flow.

4. The apparatus of claim 3 which also comprises means for treating said injected flow to produce a cleaner second flow of steam.

5. The apparatus of claim 4 wherein said turbines rotate at least one electrical generator.

6. The apparatus of claim 5 which also comprises a condenser located near the discharge of said steam turbine wherein said condenser is capable of condensing said first steam flow to produce a condensate.

7. The apparatus of claim 6 which also comprises a pressure booster pump for increasing the pressure of said injected flow.

8. The apparatus of claim 7 which also comprises:
   a boiler capable of generating a second steam flow when supplied with water and a combustible fuel; and
   means for diverting a portion of said second steam flow to said steam turbine.

9. The apparatus of claim 8 wherein said condensate comprises said water supplied to said boiler.

10. The apparatus of claim 9 wherein at least a portion of said second steam flow is also supplied to said combustion turbine.

11. The apparatus of claim 10 which also comprises:
    means for removing mixed combustion gases from said condenser; and
    means for diverting a portion of combustion products produced by said combusting means to said steam turbine.

* * * * *

UNITED STATES PATENT AND TRADEMARK OFFICE
CERTIFICATE OF CORRECTION

PATENT NO. : 5,442,906
DATED : August 22, 1995
INVENTOR(S) : Broadus

It is certified that error appears in the above-indentified patent and that said Letters Patent is hereby corrected as shown below:

Claim 2, column 11, lines 36 and 37, after the word "said" delete -- combustion turbine and said --.

Signed and Sealed this

Twenty-third Day of July, 1996

Attest:

BRUCE LEHMAN

Attesting Officer

Commissioner of Patents and Trademarks